(12) United States Patent
Rives et al.

(10) Patent No.: US 8,675,822 B2
(45) Date of Patent: Mar. 18, 2014

(54) METHODS AND SYSTEMS TO AVOID UNPRODUCTIVE DISPATCHES

(75) Inventors: David G. Rives, Mesquite, TX (US); Jason Brewer, Euless, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 3002 days.

(21) Appl. No.: 11/238,197

(22) Filed: Sep. 29, 2005

(65) Prior Publication Data

US 2007/0081633 A1   Apr. 12, 2007

(51) Int. Cl.
H04M 1/24   (2006.01)
H04M 3/08   (2006.01)
H04M 3/22   (2006.01)

(52) U.S. Cl.
USPC ..................... 379/9.03; 379/15.01

(58) Field of Classification Search
USPC ........ 379/9–9.04, 10.01, 10.03, 15.01, 15.03, 379/201.03, 201.12
See application file for complete search history.

(56) References Cited

U.S. PATENT DOCUMENTS

| | | | |
|---|---|---|---|
| 6,493,425 B1 | 12/2002 | Abe | |
| 6,614,880 B1 | 9/2003 | Lysaght et al. | |
| 6,675,325 B1 | 1/2004 | Garney et al. | |
| 6,697,335 B1 | 2/2004 | Ergun et al. | |
| 6,735,293 B2 * | 5/2004 | Doherty et al. | 379/201.12 |
| 6,754,310 B1 | 6/2004 | Steinbrenner et al. | |
| 6,788,765 B1 * | 9/2004 | Beamon | 379/27.01 |
| 6,834,099 B1 | 12/2004 | Cowden et al. | |
| 6,870,902 B2 | 3/2005 | Angliss et al. | |
| 6,870,903 B2 | 3/2005 | Angliss et al. | |
| 6,871,227 B2 | 3/2005 | Allen | |
| 6,885,730 B1 | 4/2005 | Bremer | |
| 6,898,272 B2 | 5/2005 | Talalai | |
| 2002/0181664 A1 * | 12/2002 | Yi et al. | 379/27.01 |
| 2004/0078717 A1 | 4/2004 | Allred et al. | |

OTHER PUBLICATIONS

Micromuse, "TL1 input: request message structure," Feb. 10, 2003, 10 pages.

* cited by examiner

Primary Examiner — Quoc D Tran (74) Attorney, Agent, or Firm — Hanley, Flight & Zimmerman, LLC.

(57) ABSTRACT

Methods and systems are disclosed to dispatch service resources in a communication network. An example method disclosed herein receives a notice of error for a user service, identifies equipment associated with the user service, analyzes the equipment to generate a dispatch instruction, and automatically executes the dispatch instruction in response to the equipment analysis.

34 Claims, 5 Drawing Sheets

| | 305 | 320 | 345 |
|---|---|---|---|
| Script Command | NE #1 | NE #2 | ... |
| Query_Power_Status | PwrStat | pwr? | ... |
| Query_Slot_Status | CdSlStat | n/a | ... |

FIG. 3

| NE I.D. # | NE Response Code | Recommended Action |
|---|---|---|
| NE #1 | OK | n/a |
| NE #1 | CardSlotXmismtch | Advanced Tech |
| NE #1 | CardSlotXpwr | Advanced Tech |
| NE #1 | CardSlotXswYfail | Advanced Tech |
| NE #1 | PwrOK | n/a |
| NE #1 | timeout | Standard Tech |
| NE #2 | | |
| NE #2 | | |
| NE #3 | | |
| NE #3 | | |
| NE #3 | | |
| ... | | |

METHODS AND SYSTEMS TO AVOID UNPRODUCTIVE DISPATCHES

FIELD OF THE DISCLOSURE

This disclosure relates generally to telecommunication networks and, more particularly, to methods and systems to avoid unproductive dispatches.

BACKGROUND

Communication networks for businesses or personal residences typically require a service infrastructure to maintain, update and repair the networks. A communication service provider generally employs a fleet of service personnel or repair crews having a wide variety of skills that address various facets of a large communication network. Communication networks may include telephony, cable television, satellite television, and internet services. Such skills may include low level customer home installation and wire and/or cable troubleshooting tasks, mid level system related troubleshooting, and higher level network element troubleshooting and configuration.

A typical network provides traditional telephony services, digital telephony services, high-speed data transmission, real-time video, high fidelity audio, cable/satellite television services, internet services, and various combinations of these services. In the event of network service interruptions or problems, the service provider typically dispatches one or more service personnel or repair crews to investigate and solve the problems. The repair crew typically has a vehicle with portable test equipment and may visit all areas of the network, including central offices, local exchanges, entrance bridges, cables and equipment beneath streets, telephone poles, and end-user/customer businesses and homes.

Although such repair crews having varying degrees of specialized training regularly dispatch to trouble areas, sending an over-qualified crew to address simple network issues results in significant money losses. Similarly, dispatching a repair crew that is under-qualified for a particular issue or problem results in significant money losses when a second repair crew must be dispatched after the first crew determines that the issue is outside their capabilities.

BRIEF DESCRIPTION OF THE DRAWINGS

FIG. 3 is an example view of a portion of a dispatch instruction database of the example dispatch system shown in FIG. 1.

FIG. 4 is an example view of another portion of a dispatch instruction database of the example dispatch system shown in FIG. 1.

DETAILED DESCRIPTION

Methods and systems to avoid unproductive dispatches are disclosed. An example method includes receiving a notice of error for a user service, identifying equipment associated with the user service, analyzing the equipment to generate a dispatch instruction. The method may include automatically executing the dispatch instruction in response to the equipment analysis, wherein the dispatch instruction includes a service type. An example resource dispatch system includes a correlation engine to receive service identifiers of a network user experiencing a communication service error. The correlation engine may be configured to correlate a network element with the service identifiers. The example resource dispatch system may further include a dispatch engine to automatically analyze the network element and determine a dispatch instruction. The dispatch instruction may include a service type.

Figure 1:
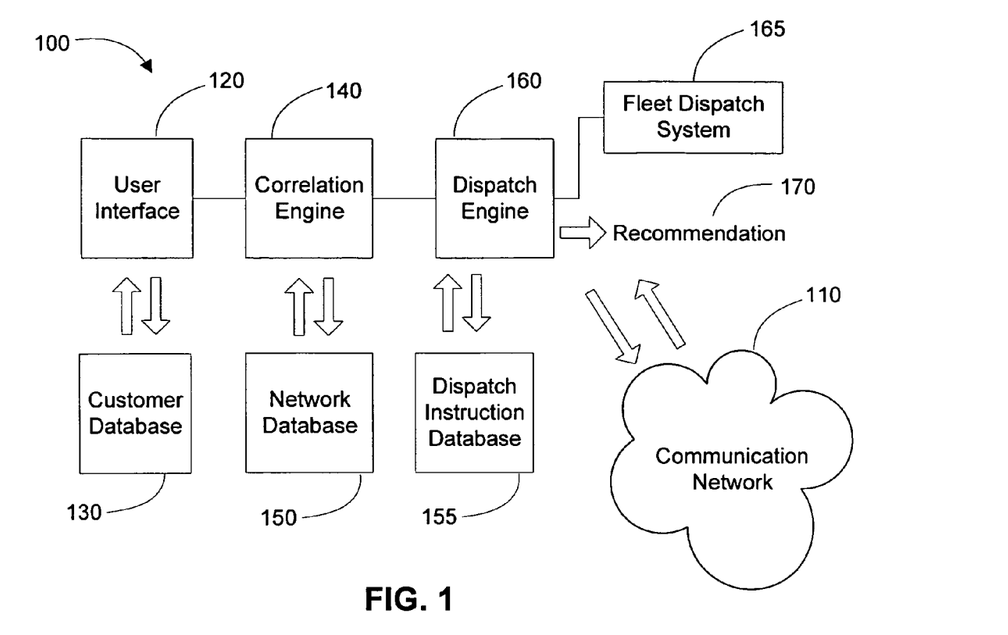
FIG. 1 is a schematic diagram illustrating an example dispatch system constructed in accordance with the teachings of the disclosure.

An example dispatch system 100 is shown in FIG. 1. As mentioned above, repair crews are typically dispatched to various parts of a communication network 110 if a customer within that network 110 reports a service problem. The communication network 110 may convey traditional telephony communications, digital telephony communications, high-speed data transmission, video transmissions, audio transmissions, broadcast television, cable/satellite television, internet communications, or any combination thereof. Both business and residential customers may utilize the services provided via the network 110. The network 110 also includes various transmission mediums to provide network services such as copper wire, optic fiber, and/or wireless mediums.

The network 110 also includes a wide variety of network elements (NE's) that assist in the provisioning of communication services. NE's are typically processor controlled hardware devices and provide switching and transport network functions such as advanced intelligent networks (AIN's), signal control points (SCP's), signal switching points (SSP's), databases, digital pair gain (DPG) devices, routers, etc. NE's are further addressable and manageable by technicians or network engineers via the internet or via an intranet managed by the communication services provider.

The NE's and various transmission mediums enable the various services offered by a communication company to reach customers. For example, each network for a particular service utilizes a system for controlling that network in a manner that is transparent to an end-user/customer. When the user picks up a telephone in a residence or business, a signal is sent to a central office (CO) switch or a local exchange to alert the CO switch or local exchange that a user wishes to make a call. A response is sent back to the user in the form of a dial tone to indicate that the required network resources are available. One known control system for implementing such a telephone network is Signaling System Number 7 (SS7). SS7 includes a set of protocols, each of which serves a specific function in controlling a network. However, SS7 is not limited to use in telephone networks and typically provides useful services in other computer-based communication networks.

The NE's that make-up particular communication networks provide various specialized services and also include communication ports for control or configuration purposes. For example, an NE may include a local area network (LAN) port, a General Purpose Interface Bus (GPIB), an RS-232 port, and/or a wireless access node that is uniquely addressable. The unique address of each NE, such as an IP-address, is stored in a database along with customer identification numbers to identify which NE's are responsible for providing services to particular customers. A service technician or network engineer accesses the NE via the communication port to determine whether it is operational, to receive error codes, and/or to verify configuration settings. Typically, the NE includes a library of communication commands for specific instrument control, such as commands formatted in the American Standard Code for Information Interchange (ASCII), Standard Commands for Programmable Instrumentation (SCPI), or transaction language 1 (TL1). TL1 is a standard man-machine language adopted by many NE manufacturers and is extensible to accommodate unique vendor specific commands.

Figure 2:
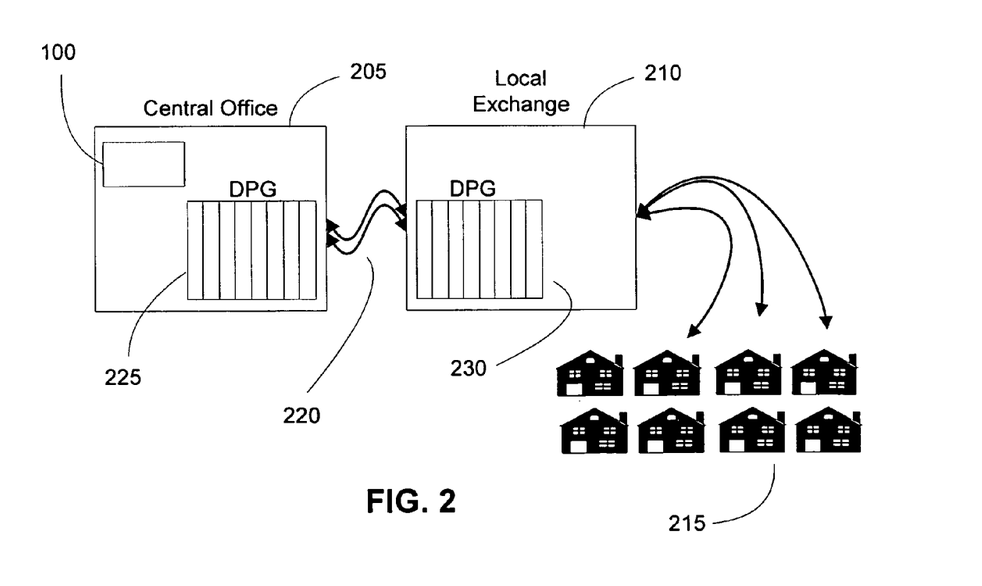
FIG. 2 is a diagram illustrating an example communication network which may employ the example dispatch system of FIG. 1.

An example sub-network of the communication network 110 is shown in FIG. 2 and includes a central office 205 and a local exchange 210. The central office 205 can include a telephone company building where subscribers' lines are coupled to switching equipment to connect other subscribers to each other, locally and long distance. The central office 205 may also include one end of a switching station or public exchange. The local exchange 210 may be referred-to as an end office where subscribers' lines are terminated, typically to homes, offices, or apartments 215. Fiber optic cables, copper cables, wireless signals and/or satellite systems may provide one or more communication mediums 220 between the central office 205 and the local exchange 210. The example sub-network also includes an example NE called a digital pair gain (DPG) 225 located at the central office 205, and another DPG 230 at the local exchange 210. In general, a DPG may multiplex a relatively large number of phone lines over a relatively lower number of communication mediums 220 to make more efficient use of an infrastructure. For example, a DPG may use one pair of wires to carry several simultaneous conversations. A DPG may also couple optical fiber lines to copper lines associated with various homes or businesses. Furthermore, a DPG may multiplex new digital subscriber line (DSL) services onto a subscriber's existing phone line.

To determine which NE's assist a subscriber when using communication services, telephone numbers may be used as a customer identification number. When referenced against a database, the telephone numbers provide a network service technician or network engineer with a list of NE's within the network that provide the subscriber with communication services. Referring to FIG. 1, the example dispatch system 100 may be available to a network engineer or customer service representative in a network operations center (NOC) or the central office 205, as shown in FIG. 2. The representative receives a customer identification number, such as a telephone number, and enters it to the dispatch system 100 via a user interface 120. The user interface 120 provides the customer service representative with dispatch system input and output and output capabilities, including but not limited to, customer identification information, network status information, service dispatch information, and post network analysis recommendation information. The dispatch system 100 may be implemented using an executable program written in, for example, C, C++, C#, Basic, assembly, Cold Fusion, Python, Perl, or any combination thereof. Prior to allocating resources to any caller complaining of a service interruption or a communication problem, the service representative first references the caller against a customer database 130 to verify that the caller is a customer.

For verified customers, the identification number (e.g., telephone number) is forwarded to a correlation engine 140 that queries a network database 150 to determine which NE's provide services to the customer associated with the identification number. Examples of such databases include, but are not limited to, SWITCH/DLE, SORD and TIRKS. For example, a customer telephone number query to the network database 150 reveals a list of NE's (suspect NE's), geographic locations of the various NE's, and the IP addresses of the various NE's. The network engineer at the NOC, upon learning of the location of the NE's that are suspected to be causing the service interruption or problem, could immediately dispatch a service truck to investigate the problem. However, rather than unnecessarily sending a repair crew or sending a crew lacking the skills to resolve the service problem to the location, a dispatch engine 160 first analyzes the NE's to gather additional information to implement a remote solution if possible.

In this example, the dispatch engine 160 uses the IP address of suspect NE's within the network 110 to query for status information. The query may be a manual or automated script telnet session that transfers TL1 commands to the suspect NE and receives status information from the suspect NE. For example, an automated script may sequence through the list of suspect NE's for IP addresses, send each NE a TL1 command requesting network presence (e.g., "Are you alive?"), and receive a response. Responses may include a timeout error, in which the suspect NE fails to return any information. Other responses may include a "yes" indicator to communicate that there are no known problems with the NE. Additionally, some responses may include specific error codes that inform the dispatch engine, for example, that the NE is powered-up and running properly, but that a particular network card or slot is malfunctioning.

NE's are manufactured by a variety of companies that typically conform to at least one industry standard communication protocol. However, each NE may not include the same library of commands to control the features of the NE. Additionally, the network database 150 may include subroutines specific to each NE. As the high level script program sequences through each NE, a subroutine unique to each NE executes to perform troubleshooting and query operations. At the completion of each NE subroutine, the high level script proceeds to the next NE, if any. For example, to simplify script programming of the user interface, a human-readable command of "Determine_Device_Status" indicates that each NE (of the several NE's related to the identification number) should attempt to query the NE status register and return a result. This human-readable script command does not conform to any of the NE commands, but each NE includes a similar command to perform a query for a general status indication. For example, one NE may require a generic status command of "stat?" to prompt a return of status information while another NE may require "RtnDevStat" as the input command to prompt a return of status information. Similarly, each NE may not include the same library of responses to query commands. To accommodate the disparity of NE commands and responses, a dispatch instruction database 155 stores a library of NE information to both send commands and interpret results.

FIG. 3 is a partial view of the example dispatch instruction database 155 contents. A column of commands 305 (of which only two rows are illustrated) includes relatively non-cryptic and human-readable instructions to be used for the scripting program. A "Query_Power_Status" command 310 and "Query_Slot_Status" 315 readily indicate that either a power or slot status query should result. Such human-readable commands allow a high level script programmer to easily assemble a series of commands to execute desired NE functionality without requiring the programmer to know detailed low level intricacies of any particular NE. A column of commands specific to NE#1 (320) includes "PwrStat" 325 and "CdSIStat" 330, which correlate or correspond to the Query_Power_Status 210 and Query_Slot_Status 315 script commands, respectively. Similarly, "pwr?" 335 and "n/a" 340 correlate or correspond to commands specific to NE #2 (345) for the respective script commands Query_Power_Status 310 and Query_Slot_Status 315. As shown in the example of FIG. 3, while NE #1 (320) includes a specific command to determine the status of slots, NE #2 (345) does not include a similar command. Such a void (e.g., "n/a") typically indicates that the NE does not include that feature, i.e., NE #2 does not have any slots to query. Thus, a script command of Query_Slot_Status 315 directed to NE #2 results in a NOP (no operation) and the request is properly ignored.

The example dispatch instruction database 155 also includes possible NE responses that, when received by the dispatch engine 160, provide recommendations (e.g., recommend actions), as shown in FIG. 4. A first column identifies a particular NE, a second column identifies various responses that the particular NE may return, and a third column identifies recommended actions based upon the response returned from the second column. In one example, NE #1 405 returns a message response "OK" 410, which corresponds to an "n/a" recommendation 415 in the third column. A recommended action of this type indicates no problem with NE #1 405 and, as will be discussed in further detail below, the dispatch engine 160 moves on to the next NE or command in the troubleshooting process. In another example, a message response of "CardSlotXmismtch" 420 from NE #1 (405) corresponds to an "Advanced Tech" recommendation 425. A recommended action of this type indicates that an advanced technician, and not a standard technician, is authorized and needed to service the NE. Furthermore, because the response is specific to a particular card, the advanced technician has an opportunity to stock the service truck with replacement components compatible with NE #1 prior to making the service call (i.e., physically traveling to the location of NE #1). As additional NE's are added to the communication network 110, a database administrator or script programmer may update the dispatch instruction database 155 pursuant to NE commands/responses delineated in, for example, an NE operator manual.

Depending on the results of TL1 commands sent to the NE's, the dispatch engine 160 returns a recommendation 170. For example, if the TL1 commands sent to all NE's return acknowledgements that everything is operational, then an alternate TL1 script may be transmitted to each NE to gather configuration data. The configuration data returned by each NE is compared to expected configuration parameters stored in the dispatch instruction database 155. In the event that one or more of the suspect NE's contains an invalid configuration, the dispatch engine 160 returns a recommendation that a network engineer upload a new configuration profile to the NE. Alternatively, the dispatch engine 160 may determine a lack of parity of the NE configuration profile and automatically upload the proper configuration profile from the network database 150. The dispatch engine recommendation 170 may also specify an authorization parameter. Authorization parameters may include full authorization to indicate that a skilled technician or network engineer should be dispatched, or a low authorization to indicate that a standard technician should be dispatched.

Another example of a dispatch engine recommendation 170 is to dispatch a standard repair crew (in lieu of an advanced repair crew) in the event that all suspect NE's are operational and the configuration profiles are current. Such a scenario may occur when the service problem or interruption concerns a customer's in-home wiring. A standard repair crew may investigate various problems that span between the NE and the customer's home. Such problems typically include wiring problems on above-ground telephone poles, below ground wires, wiring problems within a local exchange, and wiring problems within the customer's home.

Additionally, a standard repair crew may have limited authorization to service certain types of NE's. Preventing the servicing of equipment by a repair crew lacking proper training minimizes repair errors made by such standard repair crews. The limited authorization may allow the standard repair crew restricted access and/or interaction with the NE. For example, the standard repair crew may only be authorized to cycle power to the NE, or perform an NE replacement for a separate known-working NE of the same or similar type. The standard repair crew may have no access to some NE's, for example, the standard repair crew may not possess keys to various equipment sheds in which the restricted NE's are located. On the other hand, properly identifying a service problem or interruption and then sending a standard repair crew (when appropriate) rather than a repair crew with more advanced training and authorization saves money and resources.

The recommendations provided by the dispatch engine 160 may interface directly with an automated fleet service dispatch system 165. The automated fleet service dispatch system 165 may optimize service resource allocation based on, for example, service technician availability and/or geographic proximity to the problem area. The automated fleet service dispatch system 165 may also automatically interface with third party repair crews contracted by a network owner/manager to service the communication network. Alternatively, the recommendation may be reviewed manually by an operator at the NOC. The automated service dispatch system may also e-mail and/or page a network engineer if the recommendation requires such attention. The network engineer may have the highest (full) level of authorization to interact with the NE. Such full authorization may allow the network engineer both physical access to the NE and full communicative access to the NE (e.g., telnet, ftp, etc.). If the suspect NE is powered-up, the network engineer may, for example, initiate a telnet session with the suspect NE to troubleshoot the suspect NE.

Figure 5:
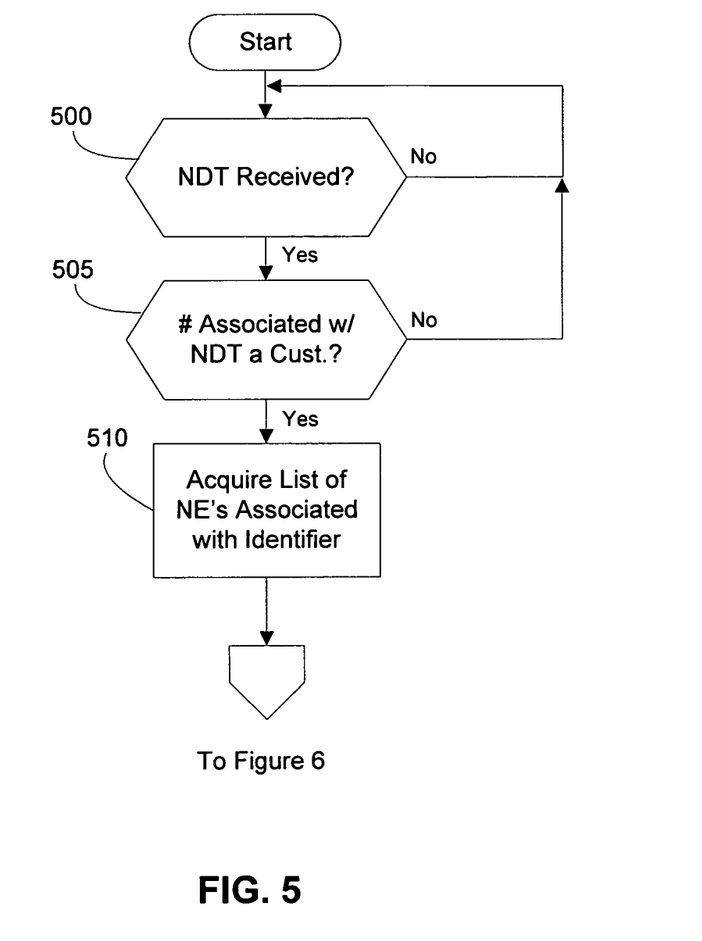
FIGS. 5 and 6 are a flow chart representative of example machine readable instructions that may be executed to implement the example dispatch system shown in FIG. 1.
Figure 6:
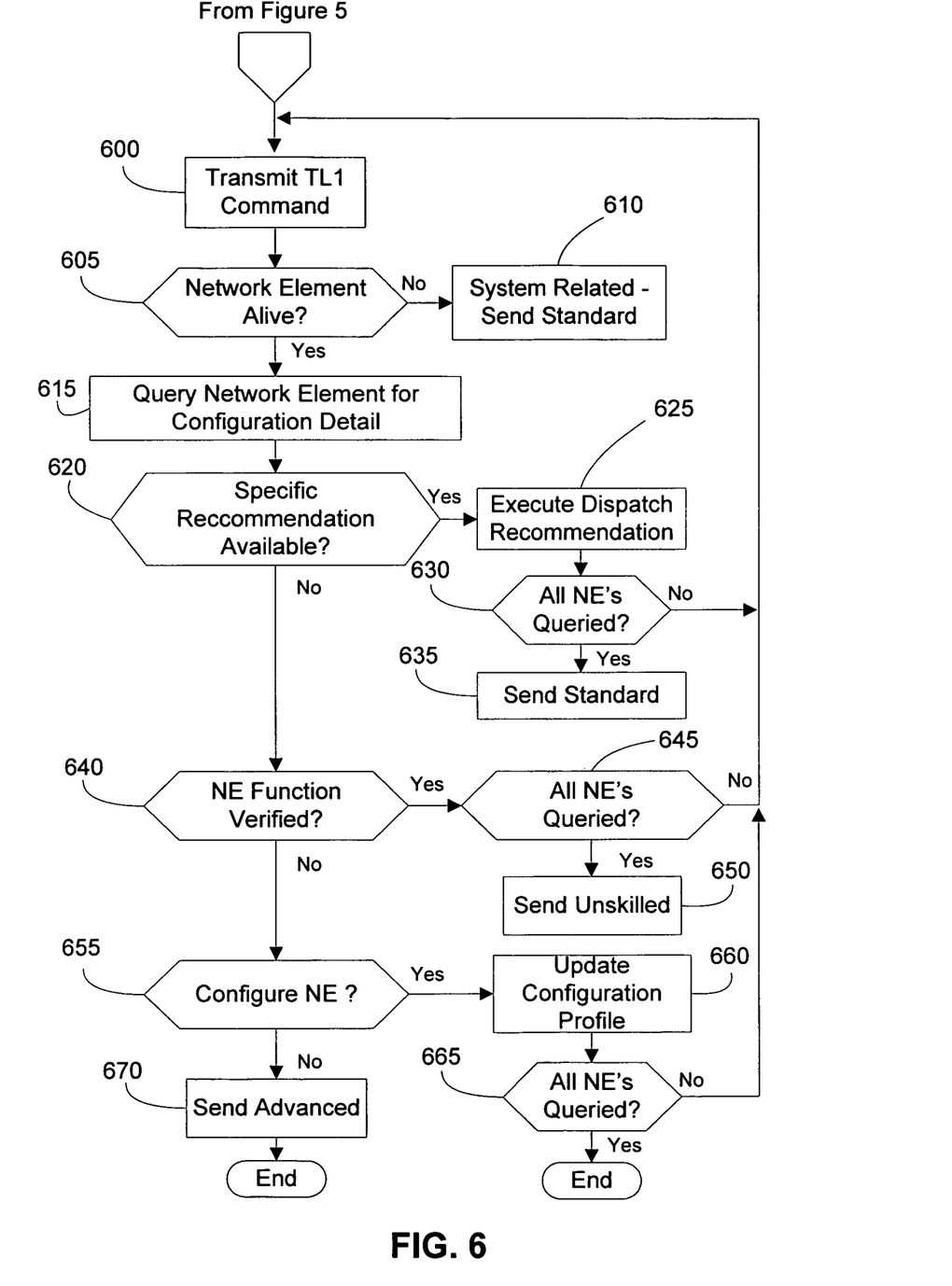

A flowchart representative of example machine readable instructions for implementing the example dispatch system 100 of FIG. 1 is shown in FIGS. 5 and 6. In this example, the machine readable instructions comprise a program for execution by a processor such as the processor 710 shown in the example computer 700 discussed below in connection with FIG. 7, a controller, and/or any other suitable processing device. The program may be embodied in software stored on a tangible medium such as, for example, a flash memory, a CD-ROM, a floppy disk, a hard drive, a digital versatile disk (DVD), or a memory associated with the processor 710, but persons of ordinary skill in the art will readily appreciate that the entire program and/or parts thereof could alternatively be executed by a device other than the processor 710 and/or embodied in firmware or dedicated hardware in a well-known manner (e.g., it may be implemented by an application specific integrated circuit (ASIC), a programmable logic device (PLD), a field programmable logic device (FPLD), discrete logic, etc.). For example, any or all of the dispatch system 100, the user interface 120, the customer database 130, the correlation engine 140, the network database 150, the dispatch instruction database 155, the dispatch engine 160, and the fleet service dispatch system 165 could be implemented by software, hardware, and/or firmware. Also, some or all of the machine readable instructions represented by the flowchart of FIGS. 5 and 6 may be implemented manually, wholly or in part. Further, although the example program is described with reference to the flowchart illustrated in FIGS. 5 and 6, persons of ordinary skill in the art will readily appreciate that many other methods of implementing the example machine readable instructions may alternatively be used. For example, the order of the execution of the blocks may be changed, and/or some of the blocks described may be changed, substituted, eliminated, or combined.

The example program of FIG. 5 begins at block 500 where the dispatch system 100 awaits notification of a network service problem or interruption such as a no-dial-tone (NDT) complaint entered into the user interface 120 by a customer service representative. If no problem notifications are received at block 500, the program loops at predetermined intervals until such a service notification is received. When a problem notification is received at block 500, the dispatch system 100 associates or correlates a customer identifier, such as the customer/subscriber telephone number with information stored in a customer database 130 at block 505. Identifiers that fail to associate or correlate with a subscriber or customer are ignored and the program returns control to block 500 to await a notification of a network service problem or interruption.

If the dispatch system 100 determines that the identifier is associated with or correlated to a subscriber/customer (block 505), then the dispatch system 100 forwards the identifier to the correlation engine 140 at block 510. The correlation engine 140 queries the network database 150 to generate a list of NE's that participate in providing the subscriber or customer associated with or correlated to the identifier with communication services. For example, the United States includes approximately 196 local access transport areas (LATA) in which telecommunication companies offer local and/or long distance services. A LATA provides, among other things, a way to delineate an area within which telecommunication companies may offer services. The network database 150 includes a list of subscribers' telephone numbers and may further identify the LATA to which a particular subscriber belongs. The resulting list of NE's includes, but is not limited to, the NE names, manufacturers, geographic locations of each NE, IP addresses and general NE descriptions.

The program continues at block 600 of FIG. 6, at which the dispatch engine 160 receives the list of NE's and queries the dispatch instruction database 155 to determine compatible TL1 commands for each NE, as discussed above in connection with FIG. 3. If a first NE (of several in a communication network servicing the subscriber) is analyzed for potential problems, the first NE is provided a simple TL1 command at block 600 to determine whether it is active or operational (e.g., "alive"). If no response from the first NE is received after a predetermined time-out period, control passes to block 610, at which it is recommended that a standard service technician be dispatched. Expiration of the predetermined time-out period typically indicates a routine or common system related problem involving a replacement of network equipment. For example, the time-out may be caused by a general power failure in a switching station, which requires general facility troubleshooting procedures. In any case, the standard technician may be provided with a replacement NE before being dispatched to the problem area. Of course, persons of ordinary skill in the art will appreciate that time-out period expirations for other types of NE's may require an advanced technician due to, for example, extraordinary and complicated configuration procedures.

On the other hand, if the NE returns a response indicating it is "alive" (i.e., operational, active, etc.) for example, then control advances to block 615 where the dispatch engine 160 queries (via a TL1 command) the NE for additional status information. The status information returned is evaluated at block 620 for a specific match with recommendation(s) present in the dispatch instruction database 155. As discussed above in connection with FIG. 4, if the NE response matches that of the NE Response Code column, then the action corresponding to the Recommended Action column is taken at block 625. For example, if the NE returns the response "OK" 410, then the recommended action of "n/a" 415 indicates no problems with this particular NE and control continues to block 630. If all NE's have been queried, control continues to block 635 to send a standard technician to address the service problem or interruption. Otherwise, if additional NE's have not yet been analyzed, control returns to block 600 in view of the next NE in the list of NE's that provide the customer with communication services. Briefly returning to block 620, if the NE response is instead "CardSlotXmismatch" 420, then an advanced technician is recommended for dispatch at block 625.

If no specific recommendation is available in the dispatch instruction database 155, control at block 620 passes to block 640 at which additional TL1 commands are transmitted to the NE to verify that the specific function of the NE is operational. For example, if the NE in question is a DPG, TL1 commands are issued to verify switch closure capabilities and switch configuration profile validity. If the TL1 commands fail to open/close switches as instructed, or the TL1 commands reveal that the configuration parameters of the DPG are invalid, control passes to block 655. At block 655, the dispatch engine 160 queries the dispatch instruction database 155 for appropriate configuration parameters and, when such parameters are available, control advances to block 660 to update the DPG with the appropriate configuration profile. The dispatch system 100 determines if additional NE's remain in the list of NE's possibly related to the service problem or interruption at block 665, in which case control returns to block 600, otherwise the analysis process ends. One of ordinary skill in the art will appreciate that even if the DPG, in this example, is responsible for the service problem or interruption, remaining NE's may also be checked to make sure the service problem is not the result of more than one improperly functioning NE. If at block 655 the dispatch system 100 includes no configuration profiles for the DPG, the dispatch engine 160 recommends that an advanced technician be sent at block 670.

Returning to block 640, if the TL1 commands verify proper operation of the NE, then control passes to block 645 at which the dispatch system 100 determines if additional NE's remain in the list of NE's possibly related to the service problem or interruption. If more NE's are in the list, control passes to block 600, otherwise control directs to block 650, in which the dispatch engine recommends that a standard technician be dispatched to the problem area.

Regardless of the authorization level or skill level of the recommended technician or network engineer, the automated fleet service dispatch system 165 may accommodate dispatching of the resource to service the NE. For example, if a minimally authorized and/or standard technician is recommended by the dispatch engine 160, the automated fleet service dispatch system 165 may determine which technician to dispatch based on geographic proximity. Other parameters to determine which technician to dispatch include, but are not limited to, a third party contractor in the vicinity of the suspect NE, real-time technician availability information, and technician skill levels and/or authorization levels.

Figure 7:
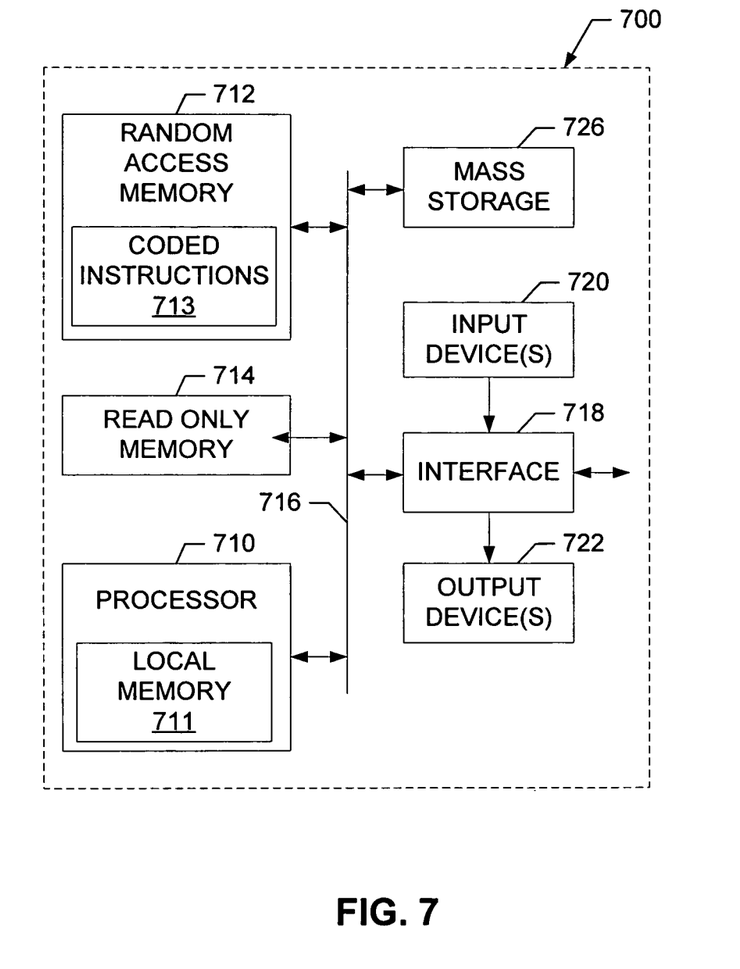
FIG. 7 is a schematic illustration of an example computer which may execute the program of FIGS. 5 and 6 to implement the example dispatch system of FIG. 1.

FIG. 7 is a block diagram of an example computer 700 capable of implementing the apparatus and methods disclosed herein. The computer 700 can be, for example, a server, a personal computer, an intelligent peripheral/service node (IP/SN), a service control point (SCP), a signal transfer point (STP), or any other type of computing device.

The system 700 of the instant example includes a processor 710 such as a general purpose programmable processor. The processor 710 includes a local memory 711, and executes coded instructions 713 present in the local memory 711 and/or in another memory device. The processor 710 may execute, among other things, the example machine readable instructions illustrated in FIGS. 5 and 6. The processor 710 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 710 is in communication with a main memory including a volatile memory 712 and a non-volatile memory 714 via a bus 716. The volatile memory 712 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 714 may be implemented by flash memory and/or any other desired type of memory device. Access to the main memory 712, 714 is typically controlled by a memory controller (not shown) in a conventional manner.

The computer 700 also includes a conventional interface circuit 718. The interface circuit 718 may be implemented by any type of well known interface standard, such as an Ethernet interface, a universal serial bus (USB), and/or a third generation input/output (3GIO) interface.

One or more input devices 720 are connected to the interface circuit 718. The input device(s) 720 permit a user to enter data and commands into the processor 710. The input device(s) can be implemented by, for example, a keyboard, a mouse, a touchscreen, a track-pad, a trackball, isopoint and/or a voice recognition system.

One or more output devices 722 are also connected to the interface circuit 718. The output devices 722 can be implemented, for example, by display devices (e.g., a liquid crystal display, a cathode ray tube display (CRT), a printer and/or speakers). The interface circuit 718, thus, typically includes a graphics driver card.

The interface circuit 718 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 726 for storing software and data. Examples of such mass storage devices 726 include floppy disk drives, hard drive disks, compact disk drives and digital versatile disk (DVD) drives. The mass storage device 726 may, for example, implement the customer database 130, network database 150, and the dispatch instruction database 155.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to dispatch service resources comprising:
    receiving a notice of error for a user service;
    identifying, using a processor, a non-premises network element (NE) associated with the user service based on a user service identifier, the non-premises NE not being physically located within a customer premises;
    querying a network database to identify an equipment control command associated with the identified non-premises NE;
    sending the equipment control command to the identified non-premises NE and receiving a response therefrom; and
    automatically invoking a dispatch instruction based on the non-premises NE response, wherein the dispatch instruction comprises a service type.

2. A method as defined in claim 1 wherein receiving a notice of error comprises receiving a telephone number associated with the user service.

3. A method as defined in claim 1 wherein identifying equipment associated with the user service comprises querying a database to correlate the user service identifier with the non-premises NE associated with the user service.

4. A method as defined in claim 3 wherein the user service identifier comprises at least one of a telephone number, an account number, or an address.

5. A method as defined in claim 1 wherein sending the equipment control commands comprises executing scripts to send equipment commands and receive equipment responses.

6. A method as defined in claim 5 further comprising querying a database for received non-premises NE responses and, if found, selecting a corresponding dispatch instruction.

7. A method as defined in claim 1 wherein automatically executing the dispatch instruction in response to the non-premises NE response comprises forwarding the dispatch instruction to a service fleet dispatch system.

8. A method as defined in claim 1 wherein the service type comprises an authorization level or a technician level.

9. A method as defined in claim 8 wherein the authorization level is at least one of zero authorization or full authorization.

10. A method as defined in claim 8 wherein the technician level is at least one of a standard technician, an advanced technician, or a network engineer.

11. A method as defined in claim 10 wherein the standard technician includes a zero authorization level.

12. A method as defined in claim 10 wherein the advanced technician includes a full authorization level.

13. A method as defined in claim 1 wherein automatically executing the dispatch instruction comprises dispatching resources based on at least one of a geographic proximity, the service type, or a third party contractor type.

14. A resource dispatch system comprising:
    a correlation engine to receive a service identifier of a network user experiencing a communication service error, and to query a network database to identify an equipment control command associated with a non-premises network element (NE) associated with the service identifier; and
    a dispatch engine to automatically analyze the non-premises NE via the equipment control command and determine a dispatch instruction, wherein the dispatch instruction comprises a service type.

15. A resource dispatch system as defined in claim 14 wherein the service identifier comprises at least one of a telephone number, an account number, or an address.

16. A resource dispatch system as defined in claim 14 further comprising a dispatch instruction database to store a plurality of dispatch instructions.

17. A resource dispatch system as defined in claim 16 wherein the dispatch instruction database further comprises a plurality of script routines for the non-premises NE.

18. A resource dispatch system as defined in claim 14 further including at least one script program to analyze the non-premises NE.

19. A resource dispatch system as defined in claim 18 wherein the at least one script program comprises at least one of iHTML script, Cold Fusion, Python, or Perl.

20. A resource dispatch system as defined in claim 14 further comprising a user interface to receive the service identifier of the network user and initiate scripts to automatically analyze the non-premises NE.

21. A resource dispatch system as defined in claim 14 further comprising a service fleet dispatch system, wherein the dispatch engine is to automatically forward the dispatch instruction to the service fleet dispatch system in response to determining the dispatch instruction.

22. A resource dispatch system as defined in claim 14 further including a plurality of network users.

23. A resource dispatch system as defined in claim 14 further including a plurality of network elements.

24. A resource dispatch system as defined in claim 14 wherein the service type is at least one of zero authorization level or full authorization level.

25. A resource dispatch system as defined in claim 14 wherein the service type is at least one of a standard technician, an advanced technician, or a network engineer.

26. An article of manufacture storing machine readable instructions that, when executed, cause a machine to:
  receive a service identifier associated with a communication service;
  identify a non-premises network element (NE) associated with the service identifier;
  query a network database to identify an equipment control command associated with the identified non-premises NE;
  send the equipment control command to the identified non-premises NE and receive a response therefrom; and
  invoke a dispatch instruction based on the non-premises NE response, wherein the dispatch instruction comprises a service type.

27. An article of manufacture as defined in claim 26 wherein the service identifier comprises at least one of a telephone number, an account number, or an address.

28. An article of manufacture as defined in claim 26 wherein the machine readable instructions, when executed, cause the machine to query the database to determine a non-premises NE associated with the communication service.

29. An article of manufacture as defined in claim 26 wherein the machine readable instructions comprise a script program to send commands and receive responses from the non-premises NE.

30. An article of manufacture as defined in claim 27 wherein the machine readable instructions, when executed, cause the machine to send at least one of ASCII format commands, SCPI commands, or TL1 commands.

31. An article of manufacture as defined in claim 26 wherein the service type comprises at least one of an authorization level or a technician level.

32. An article of manufacture as defined in claim 31 wherein the authorization level comprises at least one of no authorization or full authorization.

33. An article of manufacture as defined in claim 31 wherein the technician level comprises at least one of a standard technician, an advanced technician, or a network engineer.

34. An article of manufacture as defined in claim 26 wherein the machine readable instructions, when executed, cause the machine to dispatch resources based on at least one of a geographic proximity, a service type, an authorization level, or a third party contractor type.

* * * * *